United States Patent [19]

Stirling et al.

[11] Patent Number: 5,281,364

[45] Date of Patent: Jan. 25, 1994

[54] LIQUID METAL ELECTRICAL CONTACT COMPOSITIONS

[75] Inventors: D. Robert Stirling, Surry; J. Liam McNeil, Kent, both of England

[73] Assignee: Finch Limited, Nassau, The Bahamas

[21] Appl. No.: 887,084

[22] Filed: May 22, 1992

[51] Int. Cl.$^5$ .......................... H01B 1/00; H01B 1/02
[52] U.S. Cl. .................................. 252/512; 252/518; 252/12; 252/25; 252/31; 75/255; 310/11; 310/68 R; 420/528; 420/555
[58] Field of Search ................... 252/512, 518, 12, 25, 252/31; 75/255; 310/178, 11, 68 R, 71; 420/528, 555

[56] References Cited

U.S. PATENT DOCUMENTS

| | | | |
|---|---|---|---|
| 2,588,466 | 10/1950 | Barnes | 310/178 |
| 3,972,577 | 8/1976 | Charles et al. | 439/5 |
| 4,623,514 | 11/1986 | Arora et al. | 420/555 |
| 4,628,221 | 12/1986 | Young | 310/178 |
| 4,716,328 | 12/1987 | Shah et al. | 310/178 |
| 4,772,816 | 9/1988 | Spence | 310/306 |
| 5,013,464 | 5/1991 | Sugimura et al. | 252/526 |

FOREIGN PATENT DOCUMENTS 347089 12/1989 European Pat. Off. .
2203293 10/1988 United Kingdom .

Primary Examiner—Paul Lieberman
Assistant Examiner—Mark Kopec
Attorney, Agent, or Firm—Grady J. Frenchick

[57] ABSTRACT

Liquid metal electrical contact compositions are disclosed. Compositions of this invention consist of a metal mixture of first and second Periodic Table Group III metals and a lubricant. A gallium/indium metal mixture is preferred. Preferred lubricants are metal-based, most preferably molybdenum-based. The liquid metal electrical contact compositions are particularly useful for high current density applications.

12 Claims, No Drawings

LIQUID METAL ELECTRICAL CONTACT COMPOSITIONS

CROSS REFERENCE TO RELATED APPLICATIONS

Reference is hereby made to concurrently filed, commonly assigned patent application, Ser. No. 07/887,318, entitled "METHODS FOR TRANSFERRING CURRENT". The disclosure of the above patent application is incorporated by reference herein.

FIELD OF THE INVENTION

This invention relates to direct current (DC) or alternating current (AC) electrical devices. More specifically, this invention relates to single pole, DC or AC generators or motors and to current transfer means used therein. Yet more specifically, this invention relates to highly efficient, high current, single pole, DC or AC generators having liquid metal electrical contact compositions or current collection. This invention also relates to highly efficient methods for generating electricity.

BACKGROUND OF THE INVENTION

The principle of the single pole DC generator/motor was discovered by Michael Faraday, over 150 years ago. Faraday found that when an electrically conductive disc was rotated axially, with its edge rotating between the stationary poles of, e.g., a horseshoe magnet, a potential difference was created between the shaft and the disc. Faraday showed that it did not matter whether the magnet itself was stationary or rotating with respect to the disc. As long as the conductive disc was moving in the magnetic field, a potential was created. Faraday further determined that rotating the magnet with respect to the conducting disc stationary did not produce an induced potential. From this series of observations, Faraday concluded that a magnetic field was stationary relative to the axial rotation of both the magnet and the conducting disc. The magnetic field was, therefor, not rigidly associated with the magnet that served to induce the field.

Since the work of Faraday, many experimenters have tried to make a single pole direct current device that could be used for practical applications such as the Fawley Superconducting Homopolar Motor. The Fawley Superconducting Homopolar Motor was built in 1969 by the International Research And Development Corporation of England. The motor operated as a 3250 h.p. motor at 200 r.p.m. The motor was designed to operate a water cooling pump for a 500 M.W., Turbo generator, at the C.E.G.B., power station at Fawley England. This work is described by A.D. Appleton in 61 Proceedings of the IEEE, p. 106, January, 1973. Single pole or homopolar DC or AC devices produce low voltage and high current. Resistance levels that are acceptable for other devices are too high for a single pole DC or AC devices. Thus, most of the theoretically available power is consumed in the machine's own electrical circuitry.

DESCRIPTION OF THE PRIOR ART

High-current-density electrical machinery has extraordinary current collector requirements. Superconducting homopolar motors, for example, which operate at extremely high current densities (approximately 10,000 Amperes per square inch (15.5 MA/m$^2$)) require electrical current collector components capable of handling very large current loads with a minimum of current losses at the collection interface. Solid state brushes, such as graphite and graphite composites, commonly used in conventional motors and generators are not feasible for use in high current density motors or generators because of high wear rates and limited current carrying capability. Metals such as silver and gold also have been used to make electrical contact brushes. These materials suffer the same drawbacks. Liquid metals or alloys which are liquid at the operating temperature of the systems in which they are used, on the other hand, have proved to be the most viable current collector materials for use in such machinery.

Ideal liquid metals or alloys for such use would have low melting points, low densities, high thermal stability, high physical stability, high ability to wet the current collector surfaces in machinery in which they are used, low reactivity with oxygen, and low toxicity. In homopolar motors or generators, the rotational forces are such that a sufficiently dense liquid metal is required to retain the alloy in motor channels. High alloy stability, under the rotational forces involved, is also a valued characteristic.

Heretofore, mercury, gallium alloys, and a liquid metal eutectic of sodium and potassium containing 78 percent potassium and 22 weight percent sodium (NaK-78 have been the materials of choice for use as electrical contact material in high current density systems. While these metals generally have low melting points, low densities, and varying ability to wet current collector surfaces of machinery in which they are used, each has serious shortcomings. Mercury has toxicological properties which make its use objectionable. NaK-78 is highly reactive with oxygen and violently reactive with water. In addition, NaK-78 causes severe burns upon contact with skin. Prior art gallium alloys have been found to be unstable under the rotational forces involved in, for example, superconducting machinery.

Fusible alloys, usually the binary, ternary, quaternary, and quinternary mixtures of bismuth, lead, tin, cadmium, and indium, are well known in the alloy art for applications where low melting point is a desired property. Examples include Rose's Alloy (Bi 50 weight %, Pb 28 weight %, Sn 22 weight %), and Wood's Metal (Bi 50 weight %, Pb 25 weight %, Sn 12.5 weight %, Cd 12.5 weight %). In the literature there are, of course, many compositions of eutectic fusible alloys. These alloys have definite and minimum melting points, as compared with other compositions of the same metals, which are also well known in the alloy art. The prior art neither discloses nor suggests that such alloys are useable as current transport materials in high-current-density electrical systems.

U.S. Pat. No. 4,628,221 to Niels O. Young discloses a homopolar motor with pressurized liquid metal contact. The invention of Young uses a rotor having a circular cylindrical shell utilized as a conductor ring, a stator current collector ring of one polarity encircling one edge of the rotor conductor ring and another stator current collector ring of the opposite polarity encircling the other edge of the rotor conductor ring. Liquid metal is utilized within the cylindrical enclosure to provide continuous electrical contact between the stator current collector and the rotor ring.

U.S. Pat. No. 2,588,466 to Arthur H. Barnes discloses a unipolar or homopolar generator using a sodium/- potassium alloy as a liquid brushes. Structure adapted to employ liquid brushes also is disclosed.

Great Britain Patent Application No. 2,203,293 to Brian Parson discloses a homopolar generator comprising a rotor having an armature of conductive, ferromagnetic material. The rotor being surrounded by a ferromagnetic stator, field coils being provided on the stator, the field coils being connected to an alternating current supply to provide an alternative magnetic field. Rotation of the conductive portion of the armature in the alternating magnetic field will induce an extremely high alternating current at low voltage.

European Patent Application No. 0,347,089 discloses a homopolar device along the line of the above GB '293 application with the exception that it utilizes first and second annular elements having conductive and non-conductive sectors. Formation of annular electrical currents is thus avoided.

U.S. Pat. No. 4,772,816 to G.M. Spence discloses an energy conversion system which uses a magnetic field to accelerate charged particles toward a target electrode. The device of Spence et al. allegedly converts kinetic energy due to centripetal acceleration into electrical potential at an electrode.

U.S. Pat. No. 4,716,328 to Shah et al. discloses the utilization of trim coils and solenoidal-shaped shunts to shape a magnetic field existing in a liquid metal current collector of an acyclic (homopolar) generator. Generation circulating currents in the liquid metal medium is minimized. Sodium-potassium eutectic, i.e., Nak, is the electrically conductive liquid metal used by Shah et al.

U.S. Pat. No. 4,623,514 to Arora et al. discloses a particular liquid metal brush material for electrical machinery systems. The arora et al. composition is an alloy comprising specified weight percentages of bismuth, cadmium, indium, lead and tin.

S.L. Carr et al. in their article, "Liquid Metal, Rolling Element Slisprings For Power Transfer" published by the D.T. Naval Ship R&D Center describe the test results relating to slip rings utilizing a liquid metal interface. Carr et al. disclose flooding ordinary ball or roller bearing races with liquid metal to lower ball or roller to race electrical contact resistance. Liquid metals disclosed include Nak, and quintenary solders consisting of indium, tin, gallium, lead and bismuth in various proportions. Mercury is known to be useable as a liquid metal contact. Mercury has undesirable handling characteristics and adverse environmental implications.

None of the above prior art disclosures, alone or in combination, disclose the present invention.

SUMMARY OF THE INVENTION

Therefore, an object of the present invention is to provide a means for current transfer in high-current-density systems.

Another object of the present invention is to provide a means for high current transfer with a liquid metal-based composition that has a low density, a low reactivity with oxygen and water, and a good ability to wet the current collector surfaces of electrical machinery systems.

Yet another object of the present invention is to provide a means for transferring current between the rotor and stator of superconducting or conventional homopolar motors and generators with a liquid metal-based composition that is compatible with machinery materials and stable under the hydrodynamic, electromagnetic, and rotational forces present during operation of such systems.

Yet another object of the present invention is to provide a liquid metal-based composition which is advantageously used in bearing current collectors, especially roller, ball, or tapered, bearing current collectors.

Other objects and advantages will become apparent from the following detailed description and claims.

Briefly, in one aspect, the present invention is a liquid metal electrical contact composition or material for use in high-current-density electrical machinery systems comprising:

a) a liquid metal mixture consisting of: about 5 weight percent to about 95 weight percent of a first Periodic Table Group III metal selected from the group consisting of aluminum (Al), gallium (Ga), indium (In), thallium, (Tl), or mixtures and alloys thereof and correspondingly from about 95% to about 5% of a second Group III metal selected from the group consisting of Al, Ga, In, Tl, or mixtures and alloys thereof; and b) a lubricant.

Generally speaking, the liquid metal will occupy about 20 to about 80 volume percent (preferably about 50 to about 75 volume percent) of the contact composition with the remainder being the lubricant. The preferred first and second Periodic Table of the Elements Group III metal elements, as described above, are gallium and indium. A preferred lubricant of this invention is one which is metal-based, the preferred metal being molybdenum. A preferred metal-based lubricant for use in this invention is molybdenum-based oil.

The method of the present invention involves the step of contacting points between which it is desired to have current transferred with the above composition. The contacting step may be accomplished with any containment means or structure capable of containing a current collector liquid metal composition of this invention. Preferably, however, the contacting step is accomplished by means of a ball bearing assembly or structure, especially a ball, a roller, or taper bearing assembly, in which the above liquid metal contact composition is disposed. In yet a further preferred embodiment of the invention, the present composition is retained within a bearing current collectors, the current collector being maintained under a protective blanket of inert gas or under vacuum. Roller bearing and ball bearing current collectors constitute a preferred class of current collector assemblies.

The term "liquid metal" is used extensively herein. As used herein, "liquid metal" is intended to include any and all metallic mixtures, alloys, eutectics, eutectic mixtures, or combinations of any of the aforementioned which can be made liquid or which are inherently liquid at the operating temperature of the electrical apparatus in which the liquid metal is used as part of the electrical contact composition. Generally speaking, eutectic mixtures and alloys of low melting temperature metals will have the melt characteristics and conductivity to be of use in this invention.

DETAILED DESCRIPTION OF THE INVENTION

In a practice of the present invention, a liquid metal-based composition, as described in greater detail below, is contained or disposed between points using a containment means or containment structure between which it is desired for current to be transferred. For example, a composition of the present invention could be substituted for conventional liquid metal compositions, e.g., Nak-78, in conventional liquid metal-containing channels in superconducting or conventional homopolar motors. As another example, a composition of the present invention could be employed so as to provide low melting point conducting liquid contacts or elements or fuses in high current electrical systems. U.S. Pat. No. 4,623,514 to Arora et al., the disclosure of which is incorporated by reference herein, extensively discusses and compares prior art liquid metal electrical contact materials.

A liquid metal makes a very good surface connector as the liquid is able to assume the shape of the surface or surfaces to be connected. This lowers the contact resistance and area. When there is relative movement between the two surfaces to be connected a liquid metal is able to flow across the surfaces keeping in contact, but without generating excessive heat or wear as friction is greatly reduced.

Despite all of their advantages, liquid metal current collectors do have some drawbacks. Many previous designs for liquid metal current collectors were either slip rings or 'U' channels. The slip ring design was often just a brush and the surface separated by a small gap which was filled with liquid metal. A 'U'-shaped channel was a stationary channel filled with liquid metal which surrounded the rotor disc. A blade attached to the disc rotated in the channel forming an electrical contact. Both approaches are sound in theory in that they rely upon fluid flow to complete the electrical contact. However, when the devices were used with prior art liquid metal composition, the fluid was found to be unstable and hard to contain, making the units largely unsuitable outside the laboratory environment.

Rather than attempting to use sliprings, brushes, or open channels, the present invention preferably utilizes bearings, especially roller, ball, or taper bearings, to pass current and to contain and deploy the liquid metal composition. To our knowledge Bearings have been used, but only as a support for the current collection apparatus. Moreover, bearings have not been used with a liquid metal composition of this invention. Since bearings are usually made of high-grade steel, they are inherently good conductors of electricity. Bearings also have the advantage of a large cross-sectional area with a short 'length'. By the normal resistivity formula, $R = rl/a$ where in "R" is resistance, "r" is resistivity, "l" is length, and "a" is cross-sectional area, bearings tend to be an ideal shape for a current collector device. While running, the overall conductivity of prior art bearings was reduced as the moving balls lost surface contact with the ir races. However, when the spaces between the bearing races are filled with liquid metal, especially a preferred composition, electrical contact is established and maintained. Utilization of a liquid metal contact composition of this invention within the preferred bearing structure gives the over all bearing structure low resistance values that approach those of a stationary solid contact.

One drawback to using liquid metal current collectors has been making the liquid metal contact with the rotating and stationary sections of the unit. Various blade and turbulence devices have been employed to break the surface tension of the liquid metal which can prevent a good electrical contact. With the utilization of a bearing, the problem is eliminated. The action of the rolling elements spinning through the fluid keeps them in contact with the surfaces. In this manner most of the current passes through the bearing metal and the rotating elements, with the liquid metal simply connecting the surfaces of the balls and the races.

Another difficulty with using liquid metals is that the liquid metal must be stored or contained as a unit. Further, when liquid metals are agitated they can react with air and oxidize, so a structure to keep the liquid-metal surrounded by an inert atmosphere generally must be used. Such structures are well known, having been developed for use with the more problematic liquid metal compositions known in the prior art. Such prior art structures, per se, form no part of the present invention.

Although the liquid metal runs inside the bearing between the surfaces of the rolling elements and there races, it is not sufficiently lubricous. To ensure the reliability of the current collector bearing a lubricant must be added to the liquid metal. In a preferred practice of this invention, the lubricant selected to be combined with the liquid metal should be metal-based. Generally speaking, the metallic component of the metal-based lubricant will be significantly electrically conductive. The preferred metal-based lubricant selected should not react with the liquid metal or the cover gas, and should not increase the overall resistance of the electrical contact.

The lubricant used is preferably a molybdenum based oil chosen for its lubricating properties, and the high electrical conductivity of molybdenum.

Generally speaking a liquid metal electrical contact composition of the invention is to be sealed within the its containment structure and preferably is covered with an inert, protective gas. Nitrogen is the preferred cover gas. An overpressure of about five psi of the preferred protective gas is generally sufficient to protect the liquid metal composition contained therein from degradation. The bearings add little frictional loss to the device, and being lubricated, require only normal lubrication serving during their operational lives.

Since the liquid metal current collecting bearing is of low resistance, the electrical losses when passing large current are relatively low. Bearings also generate very little frictional heat. Thus equipment employing this invention will operate with high thermal efficiency at high speed while passing high current. These are significant, non-obvious advantages of this invention.

Generally speaking, a means, unit, or structure for containing the liquid metal composition of the invention between points from which current is to pass is self-contained. Thus, means for introducing the liquid metal-based mixture or composition and means for introducing and containing cover gas into the containment structure are to be provided. Such means or structure are well known to one skilled in this art and will not be described in greater detail herein. The preferred electrical device, containment means, or structure is disclosed in the above-referenced commonly owned applications which have been incorporated by reference herein.

As set forth above, the present liquid metal composition comprises a mixture of a lubricant and a metal mixture or composition, the preferred liquid metal composition consisting essentially of first and second metals of the Periodic Table of the Elements Group III the metals selected from the group consisting of aluminum, gallium, indium, thallium, or mixtures or alloys thereof. The preferred first and second Group III metals are gallium and indium, with a predominance of gallium being preferred.

A lubricant, e.g., a metal-based lubricant such as molybdenum oil, is also added to the liquid metal. Generally speaking, the preferred composition comprises about 5 to about 95 volume percent Group III metal as set forth above, with the remainder being the lubricant. A most preferred composition comprises about 60% liquid metal solution, mixture or alloy, and about 40% (both by volume) of the lubricant. Within the above parameters (and those mentioned above), the relative amounts of the two components of the mixture may be widely varied.

The use of bearings, e.g., roller, ball, or tapered bearings, in combination with a liquid metal composition or mixture disclosed herein is particularly advantageous. For example, a typical oil and grease lubricated bearing, prior to the present invention, would have a resistance of 50 Ohms (or more) when rotating. A bearing of the present invention, under the same circumstances would have a resistance of approaching that of a stationary solid contact. As an additional example, a typical roller bearing containment means will adequately deploy and contain the above mixture with only about 35% (or less) of the available volume, i.e., the volume of the bearing race (minus ball bearings) plus the volume of the chamber surrounding the bearing, being occupied. In this manner, significant material costs are achieved.

As noted above, the present invention can be used with current collection or containment means or systems which have been used with prior art liquid metal compositions. One such typical current collection device is described in U.S. Pat. No. 4,628,221 to Young. The teaching of the Young '221 patent is incorporated by reference herein.

The temperature of rotating components of contact, when used with the present invention fall within the normal range for conventionally lubricated devices. Temperature rise is largely determined by frictional heat and is, therefore, related to the speed at which the assembly is run. The operating temperature of the contact at presently used operating speeds (e.g., 5500 rpm) is up to about 75 degrees Centigrade. The preferred gallium/indium, lubricant mixture has its minimum resistance at temperatures above about 60 degrees Centigrade. As the speed of the contact rises, frictional heating also will increase. Thus, in some higher speed applications, it may be necessary to incorporate cooling means, structure, or apparatus. Cooling structure or means could be in the form or a water jacket or a jet sprayed and cooled lubricant mixture. As a general matter, Ohm's law can be employed to estimate the amount of heat loss that will occur for various measured resistances and currents.

EXAMPLE

In a typical application of the present invention, a 40 mm internal diameter contact bearing test rig was employed. The unit was run at 5,500 rpm while passing a current of about 10 amperes to measure contact resistance. The unit ran at about 75 degrees Centigrade.

The liquid metal electrical contact composition used comprised the following:

| | |
|---|---|
| gallium | 45 volume percent |
| indium | 15 volume percent |
| molybdenum oil | 40 volume percent |

The gallium and indium are commercially available and were purchased from the Indium Corporation of America company. The molybdenum-based oil is generally commercially available from many suppliers. The specific molybdenum oil utilized was a molybdenum disulphide dispersion which was mixed with a synthetic lubricating oil.

Cooling of the test rig was accomplished with a small, thermostatically controlled fan. After extended operation, the liquid metal mixture was removed from the bearing, the liquid metal and lubricant were separated, the molybdenum oil replaced, and the gallium/indium solution cleaned and reused. Recycling of the metal composition tends to reduce the quantity of metal entering the environment.

The chemical constituents of the liquid metal and lubricant composition added to the contact bearing remain as a substantially homogenous mixture in service. The main deposit on the bearing surface after service was gallium with traces of molybdenum, indium and sulphur from the oil base. The gallium "wets" well to the clean surface of the bearing and this greatly aids the electrical contact.

When the mixture was removed from the contact bearing after service it appeared homogeneous. However, upon closer examination, it was found to consist of small spheres of liquid metal suspended in the lubricant. The liquid metal was readily separated from the lubricant, e.g., using dilute sodium hydroxide, cleaned and then reused. The lubricant was replaced as per normal bearing maintenance schedule. The used lubricant, after treatment, contained no liquid metal.

It is to be recognized that other embodiments, both of compositions and methods of the present invention, other than as described hereinabove, are within its scope. Although the method of the present invention has been described with reference to conventional and superconducting machinery, it is to be recognized that the present invention is applicable wherever it is desired to transfer current. Further, it is obvious that numerous modifications and variations of the present invention are possible in light of the above teachings. It is therefore to be understood that, within the scope of the appended claims, the present invention may be practiced otherwise that as specifically described herein.

What is claimed is as follows:

1. A liquid metal electrical contact composition for use in high-current-density electrical systems comprising:
   a) a metal mixture consisting of: about 5 weight percent to about 95 weight percent of the composition of a first Group III metal selected from the group consisting of aluminum, gallium, indium, thallium, and mixture or alloys thereof, and correspondingly the rest of the metal mixture comprising reciprocally from about 95 to about 5 weight percent of a second Group III metal also selected from the group consisting of aluminum, gallium, indium, thallium, and mixtures or alloys thereof, wherein said second Group III metal contains at least one metal not present in said first Group III metal; and
   b) a lubricant.

2. A composition according to claim 1 wherein the first metal is gallium and the second metal is indium.

3. A composition according to claim 1 wherein the predominant metal is the first metal.

4. A composition according to claim 1 wherein the metal mixture comprises about 60 volume percent of the composition, the rest of the composition comprising lubricant.

5. A composition according to claim 4 wherein the first Group III metal is gallium and the second Group III metal is indium.

6. A composition according to claim 1 wherein the lubricant is metal-based.

7. A composition according to claim 1 wherein the lubricant is molybdenum based.

8. A composition according to claim 7 wherein the lubricant is a mixture of molybdenum disulfide dispersion in oil.

9. A liquid metal electrical contact composition for use in high-current-density electrical systems comprising:
   a) about 20% to about 80% by volume of a metal mixture consisting of: about 5 weight percent to about 95 weight percent of the composition of a first Group III metal selected from the group consisting of aluminum, gallium, indium, thallium, and mixture or alloys thereof, and correspondingly the rest of the metal mixture comprising reciprocally from about 95 to about 5 weight percent of a second Group III metal also selected from the group consisting of aluminum, gallium, indium, thallium, and mixtures or alloys thereof, wherein said second Group III metal contains at least one metal not present in said first Group III metal; and, conversely,
   b) about 80% to about 20% by volume of a metal-based lubricant.

10. A composition according to claim 9 wherein the metal mixture consists of gallium and indium.

11. A composition according to claim 9 wherein the lubricant is molybdenum-based.

12. A composition according to claim 11 wherein the lubricant contains molybdenum disulfide dispersion in oil.

* * * * *